US008863187B2

(12) United States Patent
Ho et al.

(10) Patent No.: US 8,863,187 B2
(45) Date of Patent: Oct. 14, 2014

(54) SYSTEM AND METHOD FOR PRESENTING MULTIPLE PICTURES ON A TELEVISION

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 561 days.

(21) Appl. No.: 11/731,461

(22) Filed: Apr. 2, 2007

(65) Prior Publication Data

US 2008/0239160 A1  Oct. 2, 2008

(51) Int. Cl.
*G06F 3/00* (2006.01)
*G06F 13/00* (2006.01)
*H04N 5/445* (2011.01)
*H04N 5/45* (2011.01)
*H04N 7/01* (2006.01)

(52) U.S. Cl.
CPC ............ *H04N 5/44591* (2013.01); *H04N 5/45* (2013.01); *H04N 7/0122* (2013.01)
USPC .................. 725/43; 725/38; 725/39; 725/40; 725/41; 725/42; 725/44; 725/45; 725/46; 725/47

(58) Field of Classification Search
USPC ....................................... 725/38–61; 348/706
See application file for complete search history.

(56) References Cited

U.S. PATENT DOCUMENTS

| | | | |
|---|---|---|---|
| 6,563,515 B1 * | 5/2003 | Reynolds et al. | 715/721 |
| 7,174,512 B2 * | 2/2007 | Martin et al. | 715/719 |
| 7,373,650 B1 * | 5/2008 | Rodriguez et al. | 725/41 |
| 7,631,329 B1 * | 12/2009 | Yamada | 725/40 |
| 7,802,288 B2 * | 9/2010 | Sie et al. | 725/116 |
| 2002/0180887 A1 * | 12/2002 | Kim et al. | 348/556 |
| 2003/0067558 A1 * | 4/2003 | Shintani et al. | 348/569 |
| 2003/0117430 A1 * | 6/2003 | Reynolds et al. | 345/721 |
| 2004/0070593 A1 * | 4/2004 | Neely et al. | 345/716 |
| 2006/0098596 A1 * | 5/2006 | Park et al. | 370/329 |
| 2006/0282785 A1 * | 12/2006 | McCarthy et al. | 715/760 |
| 2007/0011702 A1 * | 1/2007 | Vaysman | 725/45 |

* cited by examiner

*Primary Examiner* — Pankaj Kumar
*Assistant Examiner* — Alazar Tilahun
(74) *Attorney, Agent, or Firm* — North Shore Patents, P.C.; Michele Liu Baillie

(57) ABSTRACT

Provided is a method and system for displaying video from a plurality of video streams on a display. It includes an input interface for receiving video data from a plurality of video streams and transferring the video data to a frame controller in communication with a television display. The frame controller causes the video data from each of the plurality of different video streams to be displayed in a separate frame on the television display, and each frame occupying an area of the television display separate from an area occupied by any other frame. A system for displaying video from a plurality of video stream using the correct aspect ratio and resolution is also provided.

24 Claims, 7 Drawing Sheets

SYSTEM AND METHOD FOR PRESENTING MULTIPLE PICTURES ON A TELEVISION

FIELD OF THE INVENTION

This invention generally relates to television, and more particularly, to a system and method to display multiple pictures on a television set.

BACKGROUND OF THE INVENTION

The introduction of High Definition Television (HDTV) and the flat panel display has led to new and pleasant experience in watching television. The slimness of a flat panel television set saves space and allows a consumer to place a larger television in a room of limited size. HDTV sets support high resolution and better picture quality. Many HDTV sets sold today are flat panel television sets.

Along with the improved resolution and picture quality, the trend in HDTV sales has been towards a general increase in the size of the average television display. For example, in United States, the average size of a HDTV set sold is now approximately 30 inches, diagonal. In some Asian countries, the average size is even larger than 32 inches.

A large screen allows a consumer to more comfortably view multiple pictures. For example, a consumer may watch the Super Bowl on a large picture on the display screen, while simultaneously viewing an NBA game between the Sacramento Kings and the LA Lakers on a smaller picture, a local college basketball between Stanford and Berkeley on a third picture, and a hockey game between New York Islanders and Anaheim Ducks on a fourth picture on the television display. Not to miss any important news, the consumer may view CNN or FOX on a fifth picture. Last but not least, they may also view a sixth picture, such as from a baby monitor their 8-month old baby's room, at the same time. On a traditional smaller television screen, having six picture frames displaying simultaneously on the screen would necessitate that at least some of the picture frames would be so small as to be difficult to view at an average or normal viewing distance. With the large screen, however, more the larger display area allows for more picture detail to be discerned at the same distance than with a smaller television screen.

Currently, there are several ways to view multiple pictures simultaneously on a television set. Picture in picture (PIP) allows two pictures to be shown on a television set at the same time, with a smaller picture displayed on top of, or overlaying, a larger picture. Since the smaller picture overlays the larger picture, the larger picture is not entirely visible. This is often extremely inconvenient, as the overlaid picture may cover a portion of the larger picture of interest to the viewer. For example, the overlaid portion might cover the end zone of a football game.

Moreover, conventional PIP often does not display the overlaid pictures in their intended resolution or aspect ratio.

Also, there are PC television cards that can generate and present for display thumb-nail size pictures of many channels, and allow a user to select a channel to view from the small pictures. These small pictures are intended for channel selection purposes. They are small and difficult to be watched over a long period of time. Moreover, the PC television card can only tune to one channel at a time, thus the television channels are scanned one at a time to refresh the pictures. Due to limited processing speed, not all images and sounds of a given television channel are captured by the PC television card. The scanning and tuning speed may be so slow such that the pictures are effectively displayed as still images, or at best in a slow motion manner.

When going from a relatively small conventional television display to a larger and flatter display having improved resolution, consumers expect a major change in their enjoyment of the television viewing experience, especially after they have invested in a good quality large screen HDTV set.

Thus, there is a need to display multiple pictures on a high resolution large screen television set without overlaying another picture, while preserving the high resolution of the displayed pictures.

SUMMARY OF THE INVENTION

An aspect of the present invention provides a television system including an input interface for receiving video data from a plurality of video streams and transferring the video data to a frame controller in communication with a television display. Each of the plurality of video streams has a display aspect ratio, and the frame controller causes the video data from each of the plurality of different video streams to be displayed in a separate frame on the television display. Each frame occupies an area of the television display separate from an area occupied by any other frame.

In another aspect of the invention, the input interface receives video data from one or more sources selected from the list including broadcast television, cable television, satellite television, video cassette player (VCR), and digital versatile disk (DVD).

In one aspect of the invention, the input interface receives video data in one or more of the following formats: NTSC, PAL, and HDTV.

In another aspect of the invention, the input interface includes one or more of a coaxial interface, a radio frequency (RF) interface, a high-definition multimedia interface (HDMI), component interface, composite interface, an Ethernet interface, or a wireless network interface.

In one aspect of the invention, the input interface includes a wireless network. Any wireless network may be used, including a Wireless Local Area Network (WLAN), a Worldwide Interoperability for Microwave Access (WiMax) network, or and Ultra-wideband (UWB) network.

In another aspect of the invention, the frame controller includes a plurality of tuners, each configured to generate a sub-frame signal from the video data from one of the video streams, with each sub-frame signal corresponding to one of the separate display frames. The frame controller is further configured to combine the sub-frame signals into a frame signal for display on the television display.

Another aspect of the invention also includes a control device for communicating instructions to the frame controller. The communicated instructions include what video streams are to be displayed in which frames.

In another aspect of the invention, the frame controller communicates with the control device by infrared signals, radio signals, or a data network. If a data network is used, it may be any of Ethernet, WLAN, WIMAX, or any other data network.

In another aspect of the invention, the control device is a remote control, a cell phone, a personal computer or a laptop computer.

Another aspect of the present invention provides a method for of displaying video from a plurality of video streams on a television display. The method includes inputting video data from the plurality of video streams to a frame controller, each video stream having a display aspect ratio, causing the video data from each of the plurality of video streams to be displayed in a separate frame on the television display. Each display frame occupies an area of the television display separate from the area occupied by any other frame.

Another aspect of the present invention provides a television system including an input interface for receiving high definition television (HDTV) video data from a plurality of video streams and transferring the HDTV video data to a frame controller in communication with a television display. Each of the plurality of video streams has a display aspect ratio, and the frame controller causes the HDTV video data from each of the plurality of different video streams to be displayed in high resolution a separate frame on the television display. At least one of the video streams is displayed in a frame having a height and a width in proportion to the video stream's aspect ratio. Furthermore, each frame further occupies an area of the television display separate from an area occupied by any other frame

DETAILED DESCRIPTION

Figure 1:
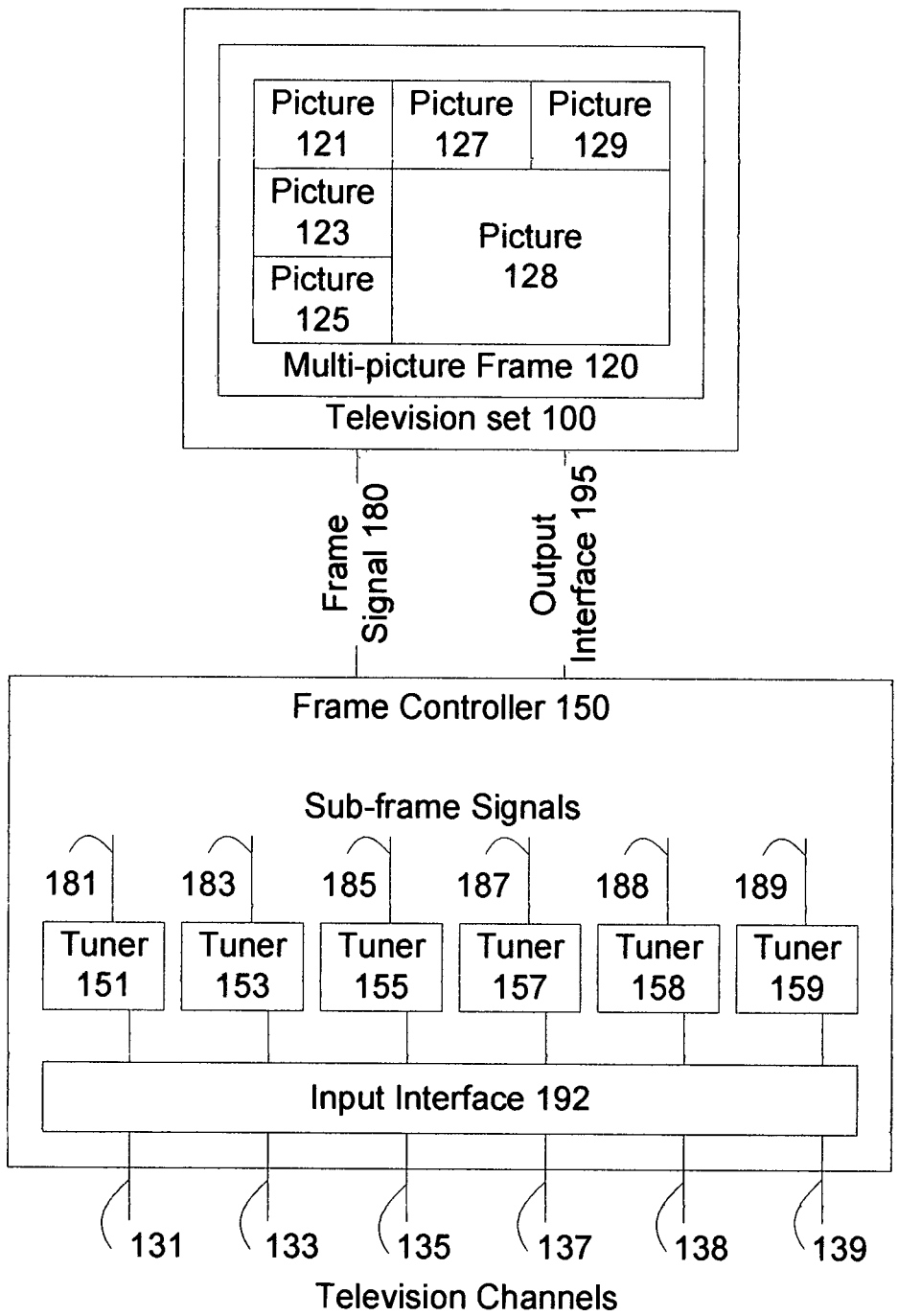
FIG. 1 is a schematic diagram illustrating a television set with a multi-picture frame.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

The term "aspect ratio" referred to in the descriptions of the various embodiments of the invention herein described refers to the ratio of the width of the video display image to the height of the video display image. For most NTSC television display images the current aspect ratio is 4:3. High-definition Television (HDTV) uses an aspect ratio of 16:9, which is similar to the aspect ratio used by motion pictures. Reference herein to displaying a video stream in a frame having a height and a width proportional to the video stream's aspect ratio means that an HDTV video stream is displayed filling a frame having a width:height ratio of 16:9. Similarly, a standard NTSC television video stream would be displayed filling a frame having a Width:height ration of 4:3.

As used herein, the terms "picture frame" and "frame" refer to the borders of a displayed picture. Unless otherwise specified, a picture frame does not necessarily have a border of any particular width, i.e., a displayed picture might occupy the entire area of the picture frame, or the picture frame may include a border. Reference to locations on a display device may be made by referring to either the location of the picture frame or to the location of displayed picture itself, without limitation. Reference to the size of a picture frame refers to the height and width of the frame, and frames of differing width and/or differing height are referred to as being of different sizes.

As used herein, the term "picture" refers to the whole of the display image and its picture frame, unless otherwise indicated, without limitation.

An embodiment of the present invention advantageously provides for the display of multiple pictures on a high resolution large screen television set without overlaying another picture, while preserving the high resolution and aspect ratio of the displayed pictures.

FIG. 1 is a block diagram of a television set 100 displaying a multi-picture frame and a frame controller 150. Television set 100 is an electronic device that receives and displays images and sounds. In one embodiment, television set 100 receives images and sounds as video data or a video stream from a television channel 131, which may originate from a broadcast television network, a cable television network, a satellite television network, or Internet Protocol television (IPTV) network. Alternatively, the video data may originate from a VCR, a DVD player, a digital video recorder (DVR), a set top box, or any other video source.

In an embodiment, television set 100 includes a screen capable of displaying a multi-picture frame 120 large enough for a user to comfortably watch multiple pictures from 6 feet away. In one embodiment television set 100 has a screen size of at least 32 inches, or 80 cm. In another embodiment, a user watches television set 100 from 15 feet away, and the screen size is at least 60 inches or 150 cm.

Multi-picture frame 120 includes multiple pictures 121, 123, 125, 127, 128, 129. Picture 128 is a major picture having a display size larger than the smaller pictures 121, 123, 125, 127 and 129. Multi-picture frame 120 differs from picture-in-picture (PIP) in that a small picture does not overlay over the large picture 128 in multi-picture frame 120. Moreover, the large picture 128 does not occupy the full screen, as in a conventional PIP.

In an exemplary embodiment, television set 100 has a screen size of 32 inches diagonal, picture 128 has a size of 22 inches diagonal, and picture 121 has a size of 9 inches diagonal. In another exemplary embodiment, television set 100 has a screen size of 40 inches diagonal, picture 128 has a size of 27 inches diagonal, and picture 121 has a size of 12 inches diagonal. In still another exemplary embodiment, television set 100 has a screen size of 60 inches diagonal, picture 128 has a size of 42 inches diagonal, and picture 121 has a size of 16 inches diagonal.

In various embodiments, picture 128 may have a picture resolution and aspect ratios of NTSC standard, defined by National Television System Committee, Phase Alternating Line (PAL), DVD video, or HDTV. In one embodiment, picture 128 has a better picture resolution than NTSC, PAL or HDTV.

The layout of the multiple pictures depicted in FIG. 1 is exemplary in nature. In various embodiments the number, dimensions and positions of the various pictures or picture frames may differ. For example, in one embodiment the size of large picture 128 is as depicted, but the sizes of the small pictures are different.

Figure 1A:
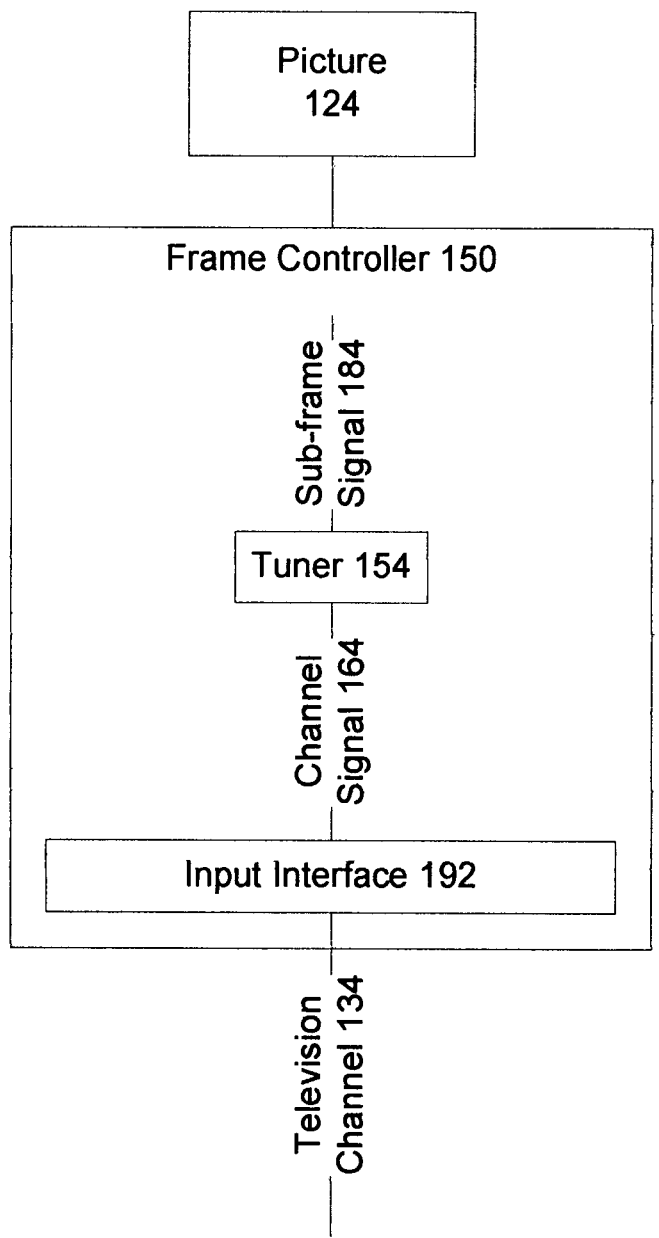
FIG. 1a is a schematic diagram illustrating a picture and a frame controller in accordance with an embodiment of the present invention.

FIG. 1*a* is a block diagram depicting a picture 124 and a frame controller 150. Picture 124 can be a larger picture 128 or smaller picture 127, as depicted in FIG. 1. In an embodiment, picture 124 displays images and sounds, i.e., the video signal of television channel 134. In one embodiment, picture 124 displays cable television channel 34, or video from a DVD player. Typically different pictures such as picture 123 and picture 129 display different television channels 133 and 139. For example, in one embodiment, picture 123 displays cable television channel 34, picture 129 displays broadcast television channel 48, picture 123 displays satellite television channel 93, and picture 127 displays a movie from a VCR.

Referring once again to FIG. 1, in an embodiment of the invention, pictures 121, 123, 125, 127, 128, and 129 display television channels 131, 133, 135, 137, 138 and 139, respectively.

In one embodiment, television 120 displays the sounds of the largest picture 128 and not of other pictures. Alternatively, in another embodiment, television 120 may display the sounds of picture 129 or of another picture as selected by the user.

Frame controller 150 controls multi-picture frame 120. In an embodiment, frame controller 150 includes input interface 192 connecting to television channels 131, 133, 135, 137, 138 and 139. Input interface 192 may include any of a coaxial interface, a Radio Frequency (RF) interface, a High-Definition Multimedia interface (HDMI), a component interface such as YPbPr or YCbCr interface, a composite interface, an Ethernet interface, or a wireless network interface. Frame controller 150 receives video streams of the said television channels from the input interface 192.

Frame controller 150 connects to television set 100. In one embodiment, frame controller 150 includes an output interface 195 connecting to television set 100. Frame controller 150 sends frame signal 180 for multi-picture frame 120 over output interface 195 to television set 100. In one embodiment, output interface 195 may include an RF interface, an HDMI interface, an S-video interface, a component interface, or a composite interface. Output interface 195 may includes a wireless network such as a Wireless Local Area Network (WLAN), a Worldwide Interoperability for Microwave Access (WiMax), or an Ultra-Wideband (UWB) network.

Referring back to FIG. 1*a*, frame controller 150 includes a tuner 154 handling a video stream or signal for picture 124. Based on television channel 134 of picture 124, tuner 154 selects television channel 134 from input interface 192, receives the video stream or signal 164 of television channel 134, transforms channel video stream or signal 164 to sub-frame signal 184.

In FIG. 1, frame controller 150 includes multiple tuners 151, 153, 155, 157, 158, 159 corresponding to multiple pictures 121, 123, 125, 127, 128, and 129, accordingly. Tuners 151, 153, 155, 157, 158 and 159 generate sub-frame signals 181, 183, 185, 187, 188 and 189. Frame controller 150 combines sub-frame signals 181, 183, 185, 187, 188 and 189 into frame signal 180, and transmits frame signal 180 over output interface 195 to television set 100. Television set 100 subsequently displays frame signal 180.

In one embodiment, television set 100 includes the frame controller 150. In such an embodiment the output interface 195 may be an internal bus or other connection within the television set 100.

Figure 2:
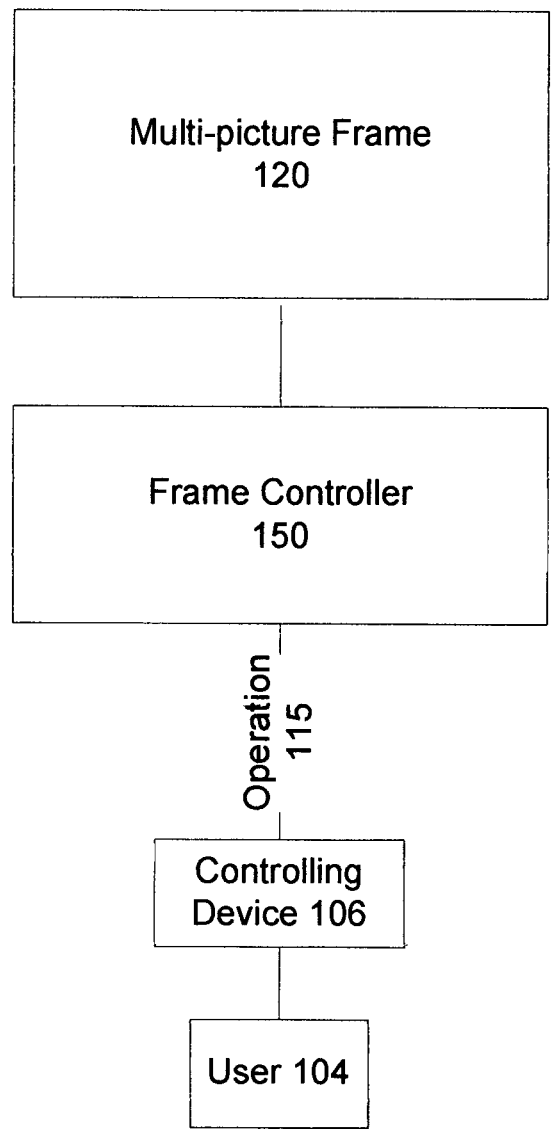
FIG. 2 is a schematic diagram illustrating controlling operations of a multi-picture frame, in accordance with an embodiment of the present invention.

FIG. 2 illustrates controlling operations of a multi-picture frame 120. In an embodiment of the invention, frame controller 150 controls operations of the multi-picture frame 120, and a user 104 uses a controlling device 106 to instruct frame controller 150. Frame controller 150 connects to the controlling device 106 through, for example infrared signals, radio signals, or a data network such as Ethernet, WLAN, or WiMax. In alternative embodiments, the controlling device 106 is a remote control, a mobile device such as a cell phone, a personal computer or a laptop.

Figure 2A:
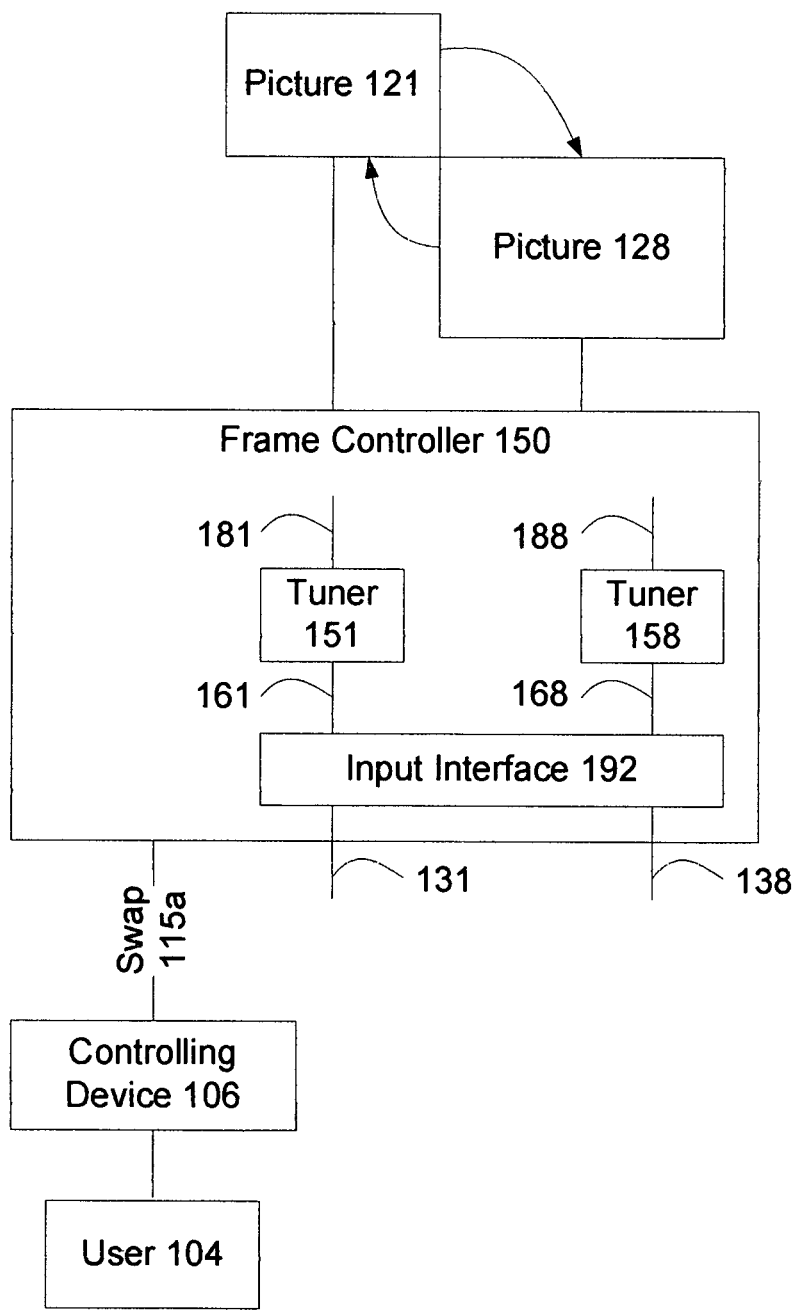
FIG. 2a is a schematic diagram depicting a process to swap the television channel of two displayed pictures, in accordance with an embodiment of the present invention.
Figure 2B:
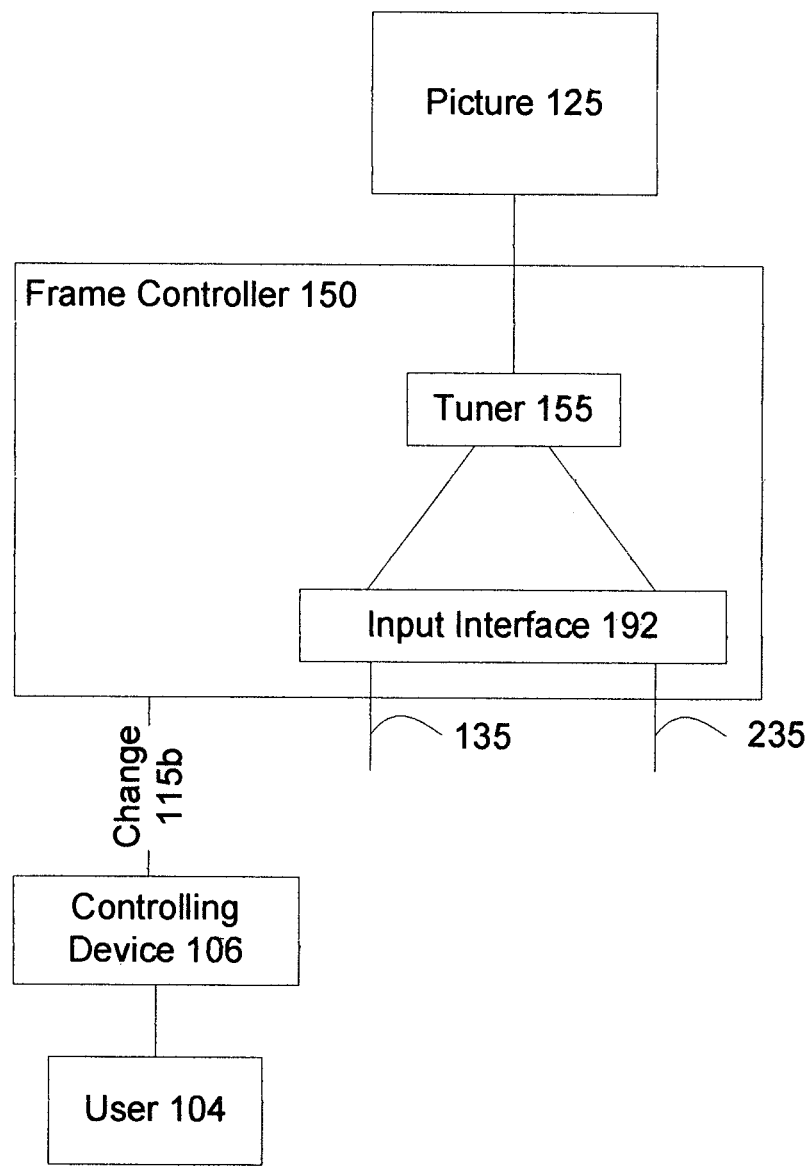
FIG. 2b is a schematic diagram depicting a process to change a television channel of a display picture, in accordance with an embodiment of the present invention.

FIGS. 2*a* and 2*b* are block diagrams illustrating picture swapping and changing operations, respectively, in an exemplary embodiment of the invention.

In FIG. 2*a*, frame controller 150 provides a swap operation 115*a* swapping picture 121 with picture 128. User 104 selects, using controlling device 106, picture 121 and picture 128. The user 104 then selects swap operation 115*a*. In response to receiving the swap operation 115*a* signal from the controlling device 106, frame controller 150 informs tuner 151 to transform channel signal 161 to sub-frame signal 181 using a large picture resolution of picture 128. Frame controller 150 informs tuner 158 to transform channel signal 168 to sub-frame signal 188 using a small picture resolution of picture 121. When frame controller 150 composes sub-frame signals 181, 183, 185, 187, 188 and 189, frame controller 150 places sub-frame signal 188 to the location of picture 121 and sub-frame signal 181 to the location of picture 128.

The replacement of picture 128 by picture 121 may be performed in several ways. In an embodiment, frame controller 150 informs tuner 158 to select television channel 131. Tuner 158 receives channel signals 168 from television channel 131, transforms channel signals 168 to sub-frame signal 188. In another embodiment, frame controller 150 informs tuner 158 not to transform channel signal 168. Frame controller 150 informs tuner 151 to transform channel signal 161 to sub-frame signal 188 using picture resolution of picture 128, in addition to sub-frame signal 181 using current small picture resolution of picture 121. Frame controller places sub-frame signal 188 to the location of picture 128.

A user 104 may swap two small pictures, such as picture 123 and picture 125, rather than swapping a small picture and a large picture.

As depicted in FIG. 2*b*, in an embodiment, frame controller 150 provides a change operation 115*b* to change a television channel of a displayed picture. In exemplary operation, a user 104 selects picture 125, which is displaying television channel 135. Next, user 104 selects the change channel operation 115b using the controlling device 106, and further selects another television channel to display. In one embodiment, the user 104 selects the new television channel directly, whereas, in an alternative embodiments, the user 104 selects the next channel in a sequence of channels, or the previous channel, or another video source altogether, such as DVD player. In one embodiment, the user 104 keys in a television channel number or name. Frame controller 150 determines television channel 235 and informs tuner 155 to switch to television channel 235.

Figure 3A:
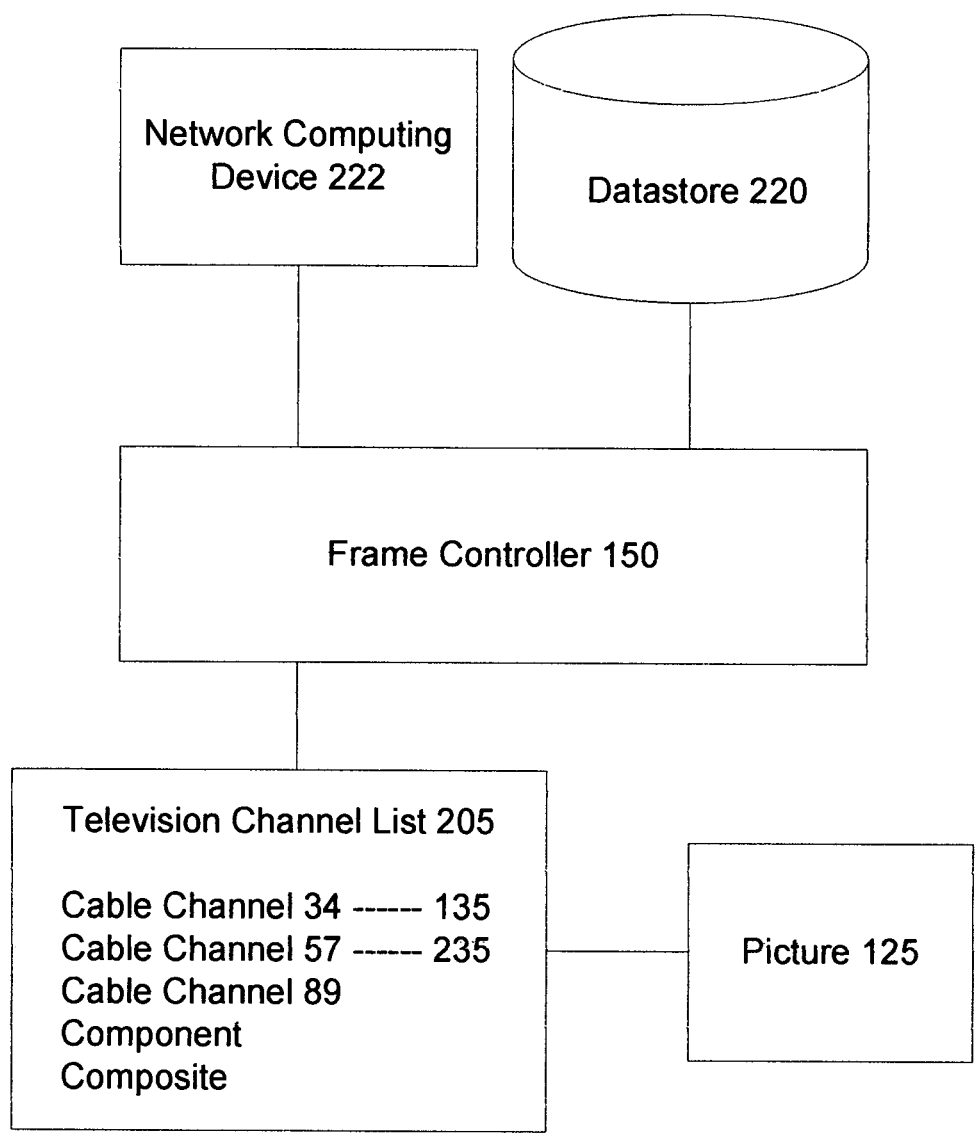
FIG. 3a is a schematic diagram depicting the use of a television channel selection list for selecting a television channel to display, in accordance with an embodiment of the present invention.
Figure 3B:
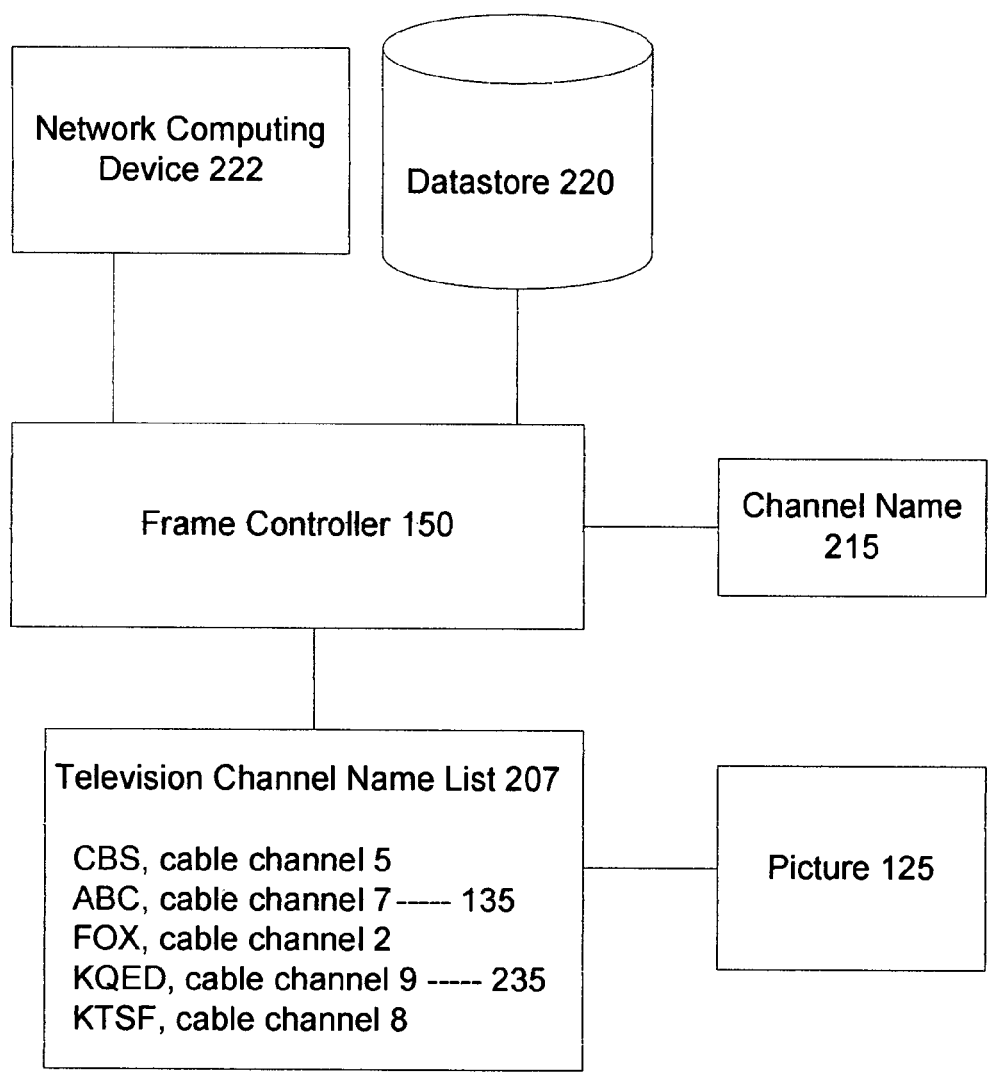
FIG. 3b is a schematic diagram depicting the use of a television channel name list for selecting a television channel to display, in accordance with an embodiment of the present invention.

FIGS. 3a and 3b illustrate the use of a television channel selection list and a television channel name list, respectively, for selecting a television channel to display.

In one embodiment, frame controller 150 determines the second television channel 235 based on picture 125. For example, picture 125 may be associated with a pre-determined television channel list 205 for picture 125. FIG. 3a illustrates television channel list 205 for picture 125. Picture 125 is currently displaying television channel 135. When the user 104 selects the next television channel, frame controller 150 determines the second television channel 235 from television channel list 205 to be cable channel 57. In another, frame controller 150 connects to a datastore 220 that includes television channel list 205. Frame controller 150 matches picture 125 against datastore 220 and retrieves television channel list 205.

In another embodiment, frame controller 150 queries a network computing device 222 that includes television channel list 205. Frame controller 150 sends picture 125 and television channel 135 to computing device 222. Frame controller 150 obtains television channel 235 from computing device 222.

In an embodiment, the user 104 specifies television channel 235 by channel name 215, as depicted in FIG. 3b. Frame controller 150 matches channel name 215 against television channel name list 207 and retrieves the corresponding television channel 235. In one embodiment, frame controller 150 connects a datastore 220 that includes television channel name list 207. Frame controller 150 matches picture 125 against datastore 220 and retrieves television channel name list 207.

In another embodiment, frame controller 150 queries a network computing device 222 that includes television channel name list 207. Frame controller 150 sends picture 125 and channel name 215 to computing device 222. Frame controller 150 obtains television channel 235 from computing device 222.

Numerous other operations may be performed by the frame controller 150 as directed by a user 104. For example, operation 115 can be used to increase or reduce the size of picture 128. In one embodiment, operation 115 can be to swap the picture whose sounds are audible between picture 123 and picture 128. In another embodiment, frame controller 150 connects to a recorder such as a DVD recorder, and operation 115 can be used to record television channel 135 of picture 125. In yet another embodiment, operation 115 can be used to restart a television program of television channel 137 of picture 127, or to pause, fast forward or fast backward television channel 137 of picture 127.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television system, comprising:
   an input interface for receiving video data from a plurality of video streams and transferring the video data to a frame controller in communication with a television display, wherein each of the plurality of video streams correspond to a different television channel;
   the frame controller causing the video data from each of the plurality of different video streams to be simultaneously displayed in corresponding separate, non-overlapping frames on the television display, each frame occupying an area of the television display separate from an area occupied by any other frame, wherein the non-overlapping frames comprise at least:
      a first frame displaying a corresponding first video stream and having a first height and a first width in proportion to the first video stream's aspect ratio,
      a second frame smaller in size than the first frame, the second frame displaying a corresponding second video stream different from the first video stream and having a second height and a second width in proportion to the second video stream's aspect ratio, and
      a third frame smaller in size than the first frame, the third frame displaying a corresponding third video stream different from the first and second video streams and having a third height and a third width in proportion to the third video stream's aspect ratio, wherein the third video stream's aspect ratio is different from the second video stream's aspect ratio,
      wherein the first frame is at least 50% larger in area than the second frame or the third frame;
   the frame controller receiving a request to swap the video streams displayed in the first frame and the second frame; and
   in response to receiving the request to swap, the frame controller:
      causing the first video stream to be displayed in the second frame, wherein the first video stream is displayed in the second frame having the second height and the second width, and
      causing the second video stream to be displayed in the first frame, wherein the second video stream is displayed in the first frame having the first height and the first width.

2. The television system according to claim 1, wherein the input interface receives video data from one or more sources selected from the list including broadcast television, cable television, satellite television, video cassette player (VCR), and digital versatile disk (DVD).

3. The television system according to claim 1, wherein the input interface receives video data in one or more of the following formats: NTSC, PAL, and HDTV.

4. The television system according to claim 1, wherein the input interface comprises one or more of a coaxial interface, a radio frequency (RF) interface, a high-definition multimedia interface (HDMI), component interface, composite interface, an Ethernet interface, or a wireless network interface.

5. The television system according to claim 1, wherein the frame controller is in communication with the television display through an output interface, the output interface comprising an RF interface, an HDMI interface, an S-video interface, a component interface or a composite interface.

6. The television system according to claim 5, wherein the output interface includes a wireless network.

7. The television system according to claim 6, wherein the wireless network is a Wireless Local Area Network (WLAN), a Worldwide Interoperability for Microwave Access (WiMax) network, or and Ultra-wideband (UWB) network.

8. The television system according to claim 1, wherein the frame controller further comprises a plurality of tuners, each of the plurality of tuners configured to generate a sub-frame signal from the video data from one of the video streams, each sub-frame signal corresponding to one of the separate display frames, the frame controller being configured to combine the sub-frame signals into a frame signal for display on the television display.

9. The television system according to claim 1, further comprising a control device for communicating instructions to the frame controller, said instructions comprising what video streams are to be displayed in which frames.

10. The television system according to claim 9, wherein the frame controller communicates with the control device by infrared signals, radio signals, or a data network.

11. The television system according to claim 10, wherein the data network is an Ethernet, WLAN, or WiMAX.

12. The television system according to claim 9, wherein the control device is a remote control, a cell phone, a personal computer or a laptop computer.

13. The television system according to claim 9, wherein the control device provides the features of display picture changing, display picture swapping, audible display picture selection, or video stream source selection.

14. The television system according to claim 13, wherein the frame controller provides a television channel list to the control device and a user selects a display channel from the television channel list.

15. The television system according to claim 13, wherein the frame controller provides a television channel name list to the control device and a user selects a display channel from the television channel name list.

16. A method of displaying video from a plurality of video streams on a television display, the method comprising:
   inputting video data from the plurality of video streams to a frame controller, wherein each of the plurality of video streams correspond to a different television channel;
   causing, by the frame controller, the video data from each of the plurality of video streams to be simultaneously displayed in corresponding separate, non-overlapping frames on the television display, each frame occupying an area of the television display separate from an area occupied by any other frame, wherein the non-overlapping frames comprise at least:
      a first frame displaying a corresponding first video stream and having a first height and a first width in proportion to the first video stream's aspect ratio,
      a second frame smaller in size than the first frame, the second frame displaying a corresponding second video stream different from the first video stream and having a second height and a second width in proportion to the second video stream's aspect ratio, and
      a third frame smaller in size than the first frame, the third frame displaying a corresponding third video stream different from the first and second video streams and having a third height and a third width in proportion to the third video stream's aspect ratio, wherein the third video stream's aspect ratio is different from the second video stream's aspect ratio; wherein the first frame is at least 50% larger in area than the second frame or the third frame
   receiving, by the frame controller, a request to swap the video streams displayed in the first frame and the second frame;
   in response to receiving the request to swap, causing, by the frame controller, the first video stream to be displayed in the second frame using a resolution of the second frame, wherein the first video stream is displayed in the second frame having the second height and the second width in proportion to the first video stream's aspect ratio; and
   further in response to receiving the request to swap, causing, by the frame controller, the second video stream to be displayed in the first frame using a resolution of the first frame, wherein the second video stream is displayed in the first frame having the first height and the first width in proportion to the second video stream's aspect ratio.

17. The method according to claim 16, wherein the frame controller further comprises an input interface that receives video data from one or more sources selected from the list including broadcast television, cable television, satellite television, video cassette player (VCR), and digital versatile disk (DVD).

18. The method according to claim 16, wherein the frame controller further comprises an input interface that receives video data in one or more of the following formats: NTSC, PAL, and HDTV.

19. The method according to claim 16, wherein the frame controller further comprises an input interface which comprises one or more of a coaxial interface, a radio frequency (RF) interface, a high-definition multimedia interface (HDMI), component interface, composite interface, an Ethernet interface, or a wireless network interface.

20. The method according to claim 16, wherein the frame controller causes the video data to be displayed on the television display over an output interface, the output interface comprising an RF interface, an HDMI interface, an S-video interface, a component interface or a composite interface.

21. The method according to claim 20, wherein the output interface comprises a wireless network.

22. The method according to claim 16, wherein the frame controller further comprises a plurality of tuners, each of the plurality of tuners configured for generating a subframe signal from the video data from one of the video streams, each sub-frame signal corresponding to one of the separate display frames;
   the frame controller being further configured for combining the sub-frame signals into a frame signal for display on the television display.

23. The method according to claim 16, further comprising:
   communicating instructions by a control device to the frame controller, said instructions comprising what video streams are to be displayed in which frames.

24. A television system, comprising:
   an input interface for receiving high definition television (HDTV) video data from a plurality of video streams and transferring the HDTV video data to a frame controller in communication with a television display, each of the plurality of video streams having a display aspect ratio, wherein each of the plurality of video streams correspond to a different television channel;
   the frame controller causing the HDTV video data from each of the plurality of different video streams to be simultaneously displayed in corresponding separate, non-overlapping frames on the television display, at least one of the video streams being displayed in a frame having a height and a width in proportion to the video stream's aspect ratio and at high resolution, each frame further occupying an area of the television display separate from an area occupied by any other frame, wherein the non-overlapping frames comprise at least:
      a first frame displaying a corresponding first video stream and having a first height and a first width in proportion to the first video stream's aspect ratio, a second frame smaller in size than the first frame, the second frame displaying a corresponding second video stream different from the first video stream and having a second height and a second width in proportion to the second video stream's aspect ratio, and a third frame smaller in size than the first frame, the third frame displaying a corresponding third video stream different from the first and second video streams and having a third height and a third width in proportion to the third video stream's aspect ratio, wherein the third video stream's aspect ratio is different from the second video stream's aspect ratio, wherein the first frame is at least 50% larger in area than the second frame or the third frame;

the frame controller receiving a request to swap the video streams displayed in the first frame and the second frame; and in response to receiving the request to swap, the frame controller:

causing the first video stream to be displayed in the second frame using a resolution of the second frame, wherein the first video stream is displayed in the second frame having the second height and the second width in proportion to the first video stream's aspect ratio, and causing the second video stream to be displayed in the first frame using a resolution of the first frame, wherein the second video stream is displayed in the first frame having the first height and the first width in proportion to the second video stream's aspect ratio.

* * * * *